US008964213B2

United States Patent
Nishimura et al.

(10) Patent No.: US 8,964,213 B2
(45) Date of Patent: Feb. 24, 2015

(54) COMMUNICATION CONTROL METHOD AND CONTROL PROGRAM

(75) Inventors: Kumi Nishimura, Nagano-ken (JP); Masatoshi Nakazawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 846 days.

(21) Appl. No.: 12/833,246

(22) Filed: Jul. 9, 2010

(65) Prior Publication Data
US 2011/0013223 A1 Jan. 20, 2011

(30) Foreign Application Priority Data
Jul. 17, 2009 (JP) .................................. 2009-169166

(51) Int. Cl.
*G06F 3/12* (2006.01)
*G06F 13/12* (2006.01)
*G06F 3/00* (2006.01)

(52) U.S. Cl.
CPC ............ *G06F 3/1284* (2013.01); *G06F 3/1203* (2013.01); *G06F 3/1224* (2013.01)
USPC .............................. 358/1.15; 710/64; 719/324

(58) Field of Classification Search
None
See application file for complete search history.

(56) References Cited

U.S. PATENT DOCUMENTS

| 5,628,030 | A | 5/1997 | Tuckner | |
|---|---|---|---|---|
| 6,230,118 | B1 * | 5/2001 | Bader et al. | 703/24 |
| 6,560,659 | B1 * | 5/2003 | Tobias et al. | 710/8 |
| 7,464,133 | B1 * | 12/2008 | Kasasaku et al. | 709/203 |
| 2005/0204366 | A1 | 9/2005 | Billau et al. | |
| 2008/0098411 | A1 * | 4/2008 | Dirstine et al. | 719/327 |
| 2008/0155132 | A1 | 6/2008 | Kato et al. | |

FOREIGN PATENT DOCUMENTS

| JP | 04-227547 | 8/1992 |
|---|---|---|
| JP | 2001-265610 | 9/2001 |
| JP | 2007-219711 A | 8/2007 |
| JP | 2008-158785 | 7/2008 |

\* cited by examiner

*Primary Examiner* — Ashish K Thomas
*Assistant Examiner* — Neil R McLean (57) ABSTRACT

In a communication environment in which multiple virtual port drivers use a single communication port, a communication control method enables a first virtual port driver and a second virtual port driver that is occupying the communication port to communicate through the same communication port. The communication control method includes executing a communication process in which the first virtual port driver emulates a specific communication port in communication with a first device driver to which the first virtual port driver corresponds. At least when the second virtual port driver occupies the communication port, the communication control method executes a communication process in which the first virtual port driver emulates, for the second virtual port driver, the second device driver to which the second virtual port driver corresponds.

12 Claims, 6 Drawing Sheets

COMMUNICATION CONTROL METHOD AND CONTROL PROGRAM

CROSS-REFERENCE TO RELATED APPLICATION(S)

Japanese Patent application No. 2009-169166 is hereby incorporated by reference in its entirety.

BACKGROUND

1. Field of Invention

The present invention relates to a communication control method and a control program, and relates more particularly to a communication control method and a control program that enable an application program that is compatible with a specific communication interface to connect to another communication interface that is different from the specific communication interface.

2. Description of Related Art

In order to use various peripheral devices that are accessible through the operating system, application programs typically incorporate various device drivers, which are software modules for controlling particular peripheral devices. See, for example, Japanese Unexamined Patent Appl. Pub. JP-A-2008-158785.More specifically, a device driver is software for handling input and output between an application program and a particular device, and for controlling input/output devices (hardware such as expansion cards and peripheral devices) such as graphic display devices, printers, and Ethernet® boards.

Configurations and methods that communicate with a physical communication port through a virtual port driver that primarily handles control of the communication protocol are also used in order to efficiently produce and use device drivers. In a communication environment having multiple virtual port drivers that all use the same physical communication port, competition occurs amongst at least some of the virtual port drivers for use of the same communication port at the same time or during the same time frame.

Depending upon the type or design of the virtual port driver, the virtual port driver may also continue to occupy the communication port to which it is connected once it secures a connection to the communication port. An example of this type of virtual port driver is, more specifically, a virtual port driver that constantly checks the connection status once communication is established. This type of virtual port driver does not release the communication port because it must constantly determine if the controlled device is connected to the communication port to which the virtual port driver is connected.

Therefore, if one virtual port driver is thus occupying the communication port and a second virtual port driver attempts to use the same communication port, the second virtual port driver will not be able to use the communication port. This means that a device driver (application program) that connects to the communication port through the second virtual port driver will not be able to use the communication port.

SUMMARY OF INVENTION

In a communication environment in which a plurality of virtual port drivers use a single communication port and there is a virtual port driver occupying the communication port, a communication control method and control program according to the present invention enable a virtual port driver other than the virtual port driver that is occupying the communication port to use the communication port and communicate.

A first aspect of the invention is a communication control method for a control device that has a plurality of device drivers, including a first and a second device driver, respectively corresponding respectively to a plurality of virtual port drivers, including a first and a second virtual port driver, that use a common communication port, and that communicates with a controlled device through the virtual port drivers and the common communication port. The communication control method comprises executing a first communication process in which the first virtual port driver emulates a specific communication port addressed by the first device driver to which the first virtual port driver corresponds. When at least the second virtual port driver occupies the common communication port, the method further includes executing a second communication process in which the first virtual port driver emulates, for the second virtual port driver, the second device driver to which the second virtual port driver corresponds.

A communication control method according to another aspect of the invention includes executing a third communication process in which the first virtual port driver has a communication module that corresponds to the second virtual port driver and emulates the second device driver through the communication module.

In this aspect of the invention the first virtual port driver emulates a specific communication port in communication with the fist device driver to which the first virtual port driver corresponds, and at least when another (second) virtual port driver occupies that communication port, emulates, in communication between the first and second virtual port drivers, the latter occupying the communication port, the second device driver to which the second virtual port driver corresponds.

The first device driver corresponding to the first virtual port driver, or more particularly the application that uses this device driver to communicate through the common communication port, can communicate through such port without being affected by whether or not another virtual port driver occupies the communication port.

The communication control method according to another aspect of the invention further preferably includes the first virtual port driver (i) processing a communication request to the common communication port; and executing a fourth communication process that, when a response permitting communication through the common communication port is not received in response to the communication request process, determines that the second virtual port driver occupies the common communication port and emulates the second device driver to which the second virtual port driver corresponds.

When one virtual port driver asserts a communication request to the common communication port and then does not receive a response permitting communication through such port, this aspect of the invention determines that another virtual port driver is occupying the communication port and therefore goes to a communication process that emulates the specific device driver corresponding to that other virtual port driver. As a result, the application, or more particularly the user, can execute the communication process to communicate with a particular device without knowing whether or not the communication port is occupied.

Another aspect of the invention entails a computer-readable medium containing a control program for execution by one or more processors for controlling a control device that has a plurality of device drivers, including first and second device drivers, respectively corresponding to a plurality of virtual port drivers, including a first and a second virtual port driver, that use a common communication port, and that communicates with a controlled device through the virtual port drivers and the common communication port. The control program comprises instructions for executing a first communication process in which the first virtual port driver emulates a specific communication port in communication with the first device driver to which the first virtual port driver corresponds; and instructions for executing a second communication process in which the first virtual port driver emulates, for the second virtual port driver, the second device driver to which the second virtual port driver corresponds, when at least the second virtual port driver occupies the common communication port.

In a control program according to another aspect of the invention, the control program further includes instructions for executing a third communication process in which the first virtual port driver has a communication module that corresponds to the second virtual port driver, and emulates the second device driver through the communication module.

With this aspect of the invention, the device driver corresponding to the first virtual port driver, or more particularly the application that uses this device driver to communicate through the communication port, can communicate through the communication port without being affected by whether or not another virtual port driver occupies the communication port.

Another aspect of the invention is embodied in a control device that is configured to communicate with a controlled device by executing communication processes as described above.

EFFECT OF THE INVENTION

In a communication environment in which there is a plurality of virtual port drivers that use a single communication port and there is a virtual port driver occupying the communication port, the communication control method and control program of the invention enable a virtual port driver other than another virtual port driver that is occupying the communication port to communicate through the occupied communication port.

Therefore, when a plurality of virtual port drivers use a same communication port, the application program can communicate through the same communication port regardless of which device driver using any of the virtual port drivers is used.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A preferred embodiment of the present invention is described below with reference to the accompanying figures.

Figure 1:
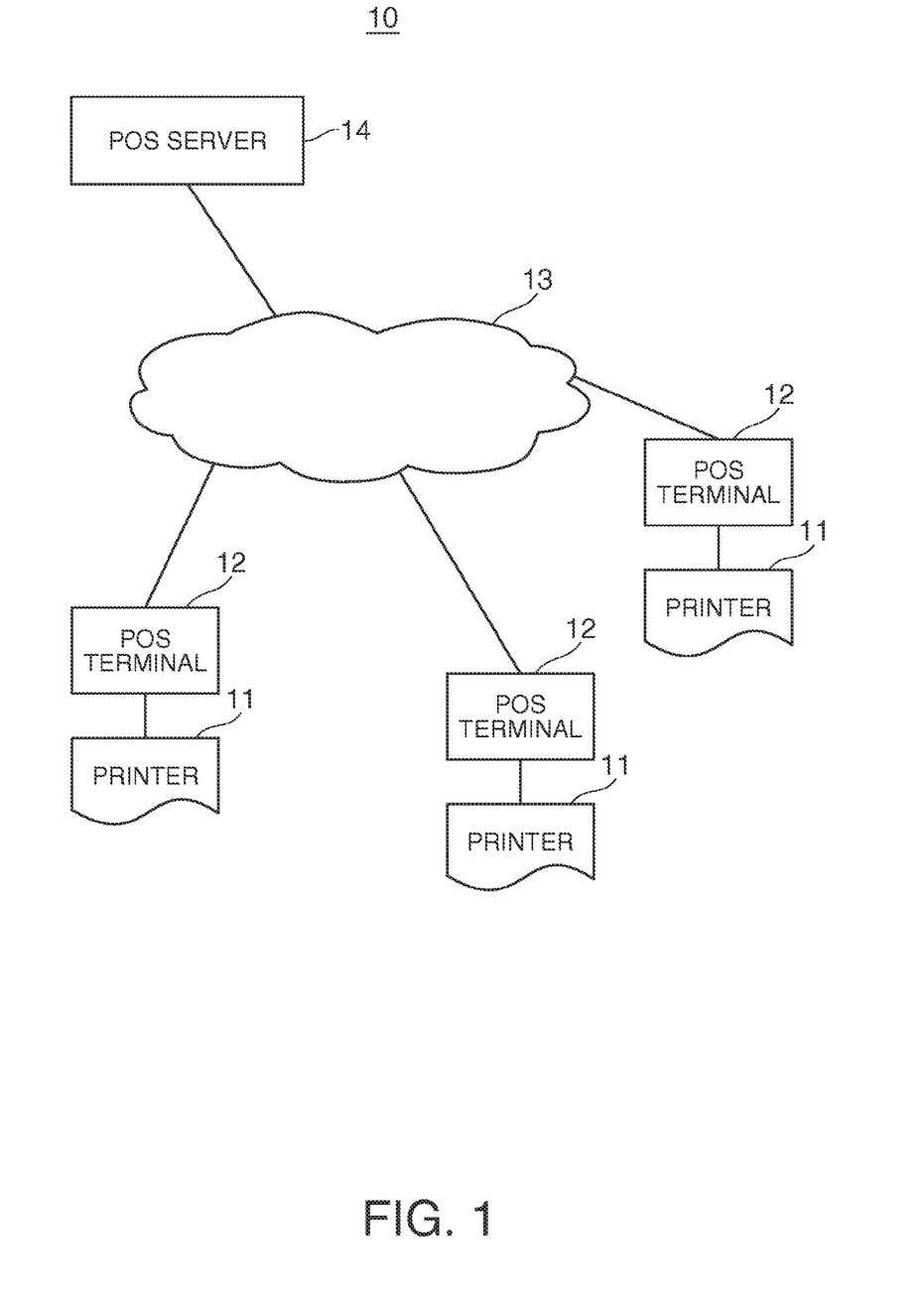
FIG. 1 is a block diagram showing the configuration of a POS system according to a preferred embodiment of the invention.

FIG. 1 is a block diagram showing the configuration of a POS system according to a preferred embodiment of the invention. The POS system 10 is a sales management system typically used in retail stores such as supermarkets. A POS system 10 generally has a plurality of POS terminals 12 each with a printer 11 connected thereto for printing receipts or coupons, for example, and a POS server 14 connected to the plural POS terminals 12 over the Internet or other communication network 13. The POS server 14 administers the plural POS terminals 12 and manages data such as sales data collected from the POS terminals 12.

Note that in this embodiment of the invention the printers 11 function as controlled devices, and the POS terminals 12 function as control devices that control the controlled devices.

Figure 2:
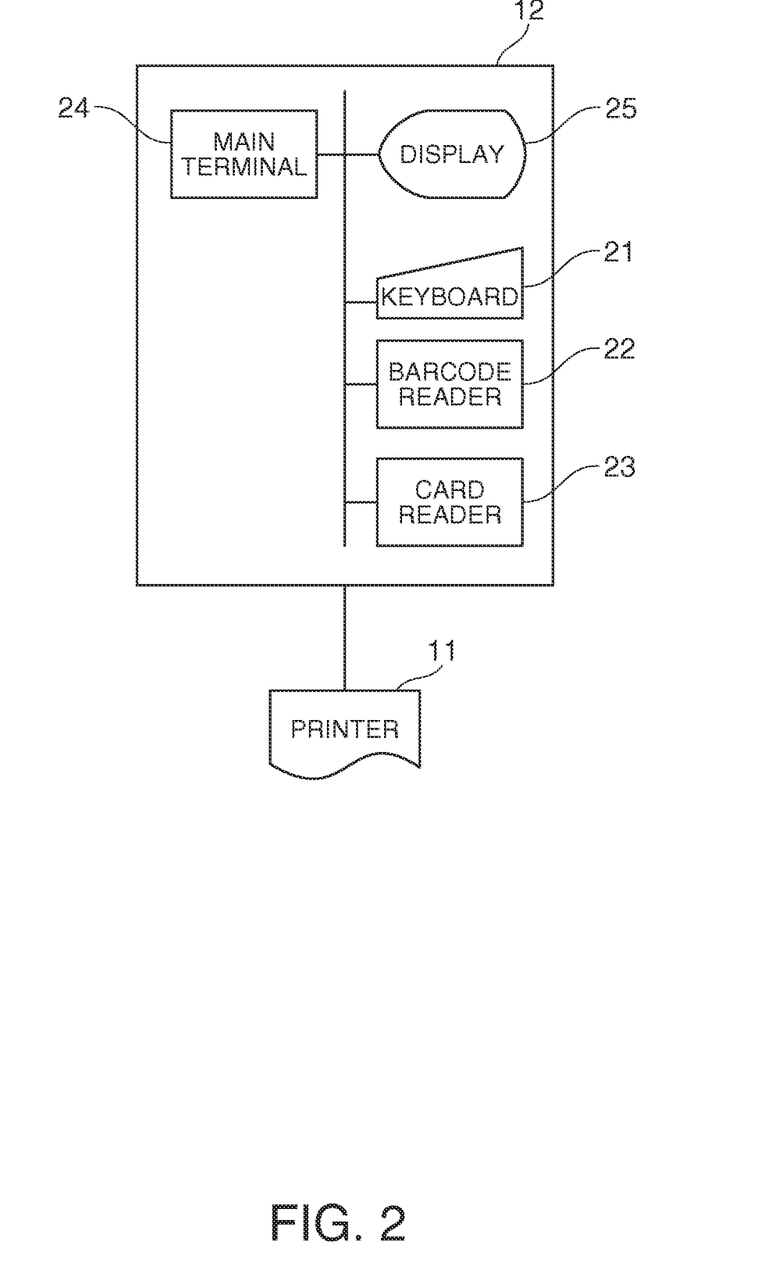
FIG. 2 is a block diagram showing the configuration of a POS terminal device.

FIG. 2 is a schematic block diagram of a POS terminal 12. The POS terminal 12 has a keyboard 21, barcode reader 22, card reader 23, main terminal 24, and a display 25.

The keyboard 21 is used by the operator to manually input product information such as the price, product code, and discount rate, customer information such as age and sex, or other information.

The barcode reader 22 is used to read the barcode affixed to each product and thereby input product information. The card reader 23 is used to read customer credit cards or membership cards, for example, and to capture information needed to process credit card transactions and customer information such as membership number.

The main terminal 24 generates information for printing receipts and coupons based on product data sent from the POS server 14 and information input from the keyboard 21, barcode reader 22, or card reader 23, and outputs the print data to the printer 11. The display 25 displays product information generated based on the product data sent from the POS server 14, and displays the product name and price information, for example, for the customer.

In this embodiment of the invention, the main terminal 24 is rendered by a computer having, for example, a MPU, ROM, and RAM (not shown), and controls operation based on a control program stored in ROM.

Figure 3:
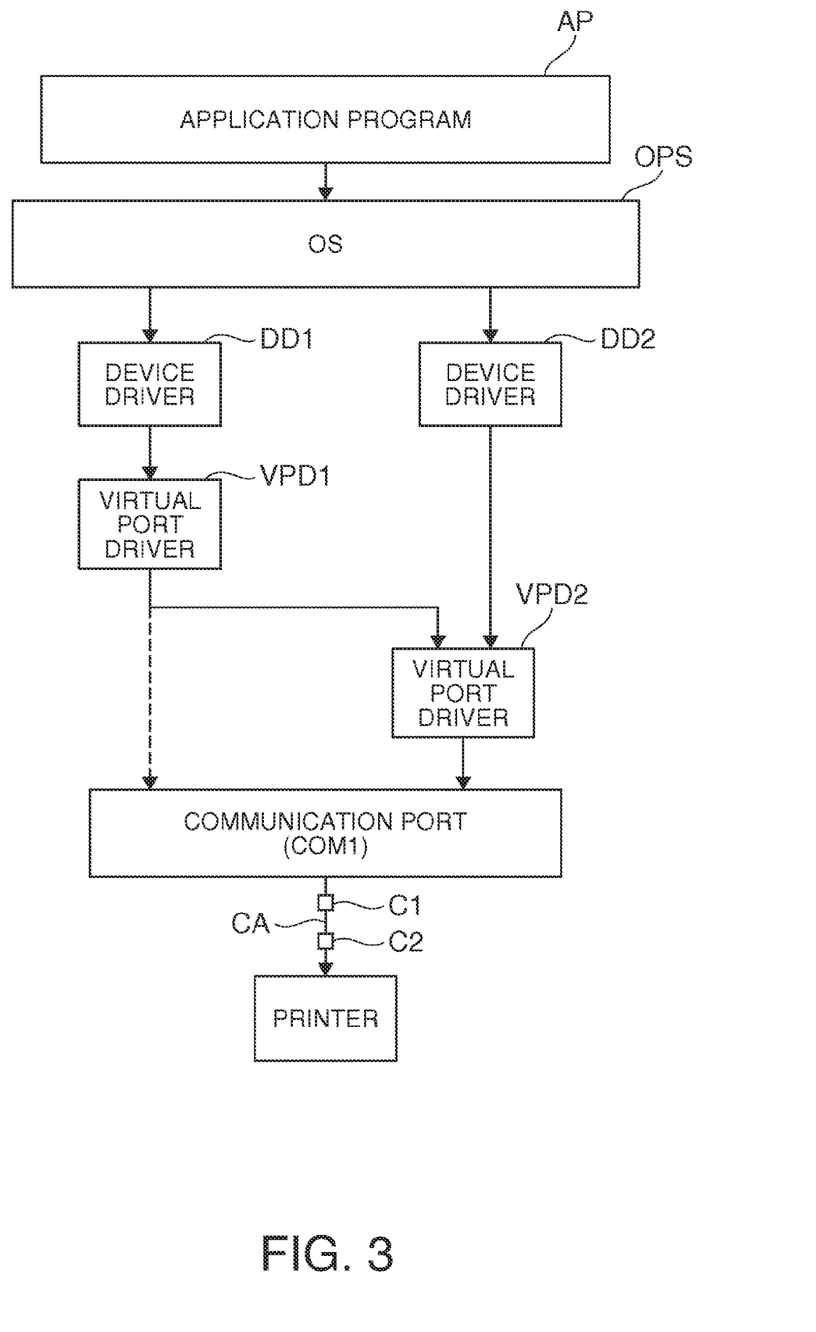
FIG. 3 is a functional block diagram of the communication control system of the POS terminal device in accordance with embodiments of the invention.

The printer 11 and POS terminal 12 are connected through connectors C1 and C2 and a communication cable CA, as shown in FIG. 3.

The POS server 14 is rendered by a computer having an MPU, ROM, RAM, hard disk drive storing a database, and other components not shown.

FIG. 3 is a functional block diagram of the communication control system of the POS terminal 12.

An application program AP (such as a POS terminal control program) that runs under the operating system (OS) OPS of the POS terminal 12 is designed to accommodate unknown peripheral devices. Thus, the specific type of printer 11 that may be connected as a peripheral device to the POS terminal 12 may be unknown. As a result, when the printer 11 is actually connected, a device driver DD1 corresponding to the protocol used to control the printer 11 may also be installed.

However, when the device driver DD1 has a function for controlling the actual communication port (a physical port such as a LPT port, COM1, or USB port), the communication port with which it can communicate is identified uniquely and cannot be easily changed.

As a result, when the device driver DD1 is installed to a system that does not have a communication port that is compatible with the device driver DD1, a virtual port driver VPD1 is installed between the device driver DD1 and the communication port. The virtual port driver VPD1 then converts the protocol used by the device driver DD1 to communicate with the communication port to the protocol used by the communication port to which the peripheral device is actually connected.

In addition, writing and using the device driver is more efficient if the protocol portion corresponding to the communication port is extracted as a virtual port driver because it can be shared between different types of devices and communication ports. In addition, communication between the device driver and the virtual port driver is possible using a simple communication protocol, which can be easily changed. Conversion is also possible if a different communication protocol is set.

For example, when the communication port used by the device driver DD1 is the LPT port and the communication port to which the printer 11 is actually connected is communication port COM1, the virtual port driver VPD1 converts the protocol of the LPT port to the protocol compatible with the COM port. More specifically, the virtual port driver VPD1 emulates the LPT port for the device driver DD1, emulates a device driver compatible with communication port COM1 for communication through the communication port COM1, and thereby enables the device driver DD1 to control the printer 11 through the COM port.

Emulating the LPT port (communication port) as used herein means handling the input and output of high and low level digital signals so that it appears to the communicating device (device driver DD1 in the foregoing example) that it is communicating directly with the LPT port. Emulating a device driver similarly means handling the sending and receiving of data (including both commands and data) so that the communicating device (communication port COM1 in the foregoing example) appears to be actually exchanging data with the device driver. Other emulation operations noted below operate in the same way.

If a different type of printer or other peripheral device was connected to the communication port before the device driver DD1 was installed, a device driver DD2 for that other type of printer or peripheral device may have also been previously installed.

Because the device driver DD2 in this configuration controls a specific communication port, the communication port with which it can communicate is fixed and cannot be easily changed. Therefore, in order to convert the protocol of the communication port with which device driver DD2 communicates to the protocol used by the communication port to which the peripheral device is actually connected, a virtual port driver VPD2 may be installed between the device driver DD2 and the communication port. In other words, the virtual port driver VPD2 emulates the communication port used by the device driver DD2 for the device driver DD2, emulates the device driver that communicates with communication port COM1 for the communication port COM1, and thereby enables the device driver DD2 to control the printer 11 through communication port COM1.

In this situation the virtual port driver VPD2 may occupy communication port COM1. This can happen, for example, because the virtual port driver VPD2 must constantly monitor whether or not the controlled device is connected to the communication port.

When the communication port COM1 is thus occupied, a virtual port driver VPD1 that is subsequently installed cannot access communication port COM1 and therefore cannot communicate through communication port COM1. As a result, the device driver DD1 that uses the virtual port driver VPD1, that is, the application program AP, cannot function.

Therefore, if a virtual port driver VPD2 that occupies the communication port is already present when another virtual port driver VPD1 is installed in this embodiment of the invention, this other virtual port driver VPD1 is configured to operate by communicating with the desired communication port through virtual port driver VPD2.

More specifically, when the virtual port driver VPD2 converts the protocol compatible with device driver DD2 to the protocol compatible with the occupied communication port, the virtual port driver VPD1 operates to convert the protocol of the device driver DD1 to the protocol of the device driver DD2.

Yet more specifically, virtual port driver VPD1 emulates the communication port COM1 for device driver DD1, and emulates the device driver DD2 that is compatible with the communication port COM1 for virtual port driver VPD2. As a result, the device driver DD1 can control the printer 11 through communication port COM1.

As a result, virtual port driver VPD1 is apparently identical to device driver DD2 from the perspective of virtual port driver VPD2, and the application program AP can control the printer 11 through the communication port whether or not virtual port driver VPD2 occupies the communication port.

The operation of the device driver and the virtual port driver are described in greater detail below.

The virtual port driver VPD1 below is configured to communicate through the communication port COM1 under the control of the driver control module 31 of the device driver DD1.

When the application program AP outputs a communication request, the driver control module 31 of the device driver DD1 sends a communication request using its own communication protocol to the virtual port driver VPD1.

As a result, the virtual port driver VPD1 emulates a communication port based on the communication protocol used by the driver control module 31 (FIG. 4) of the device driver DD1.

Figure 4:
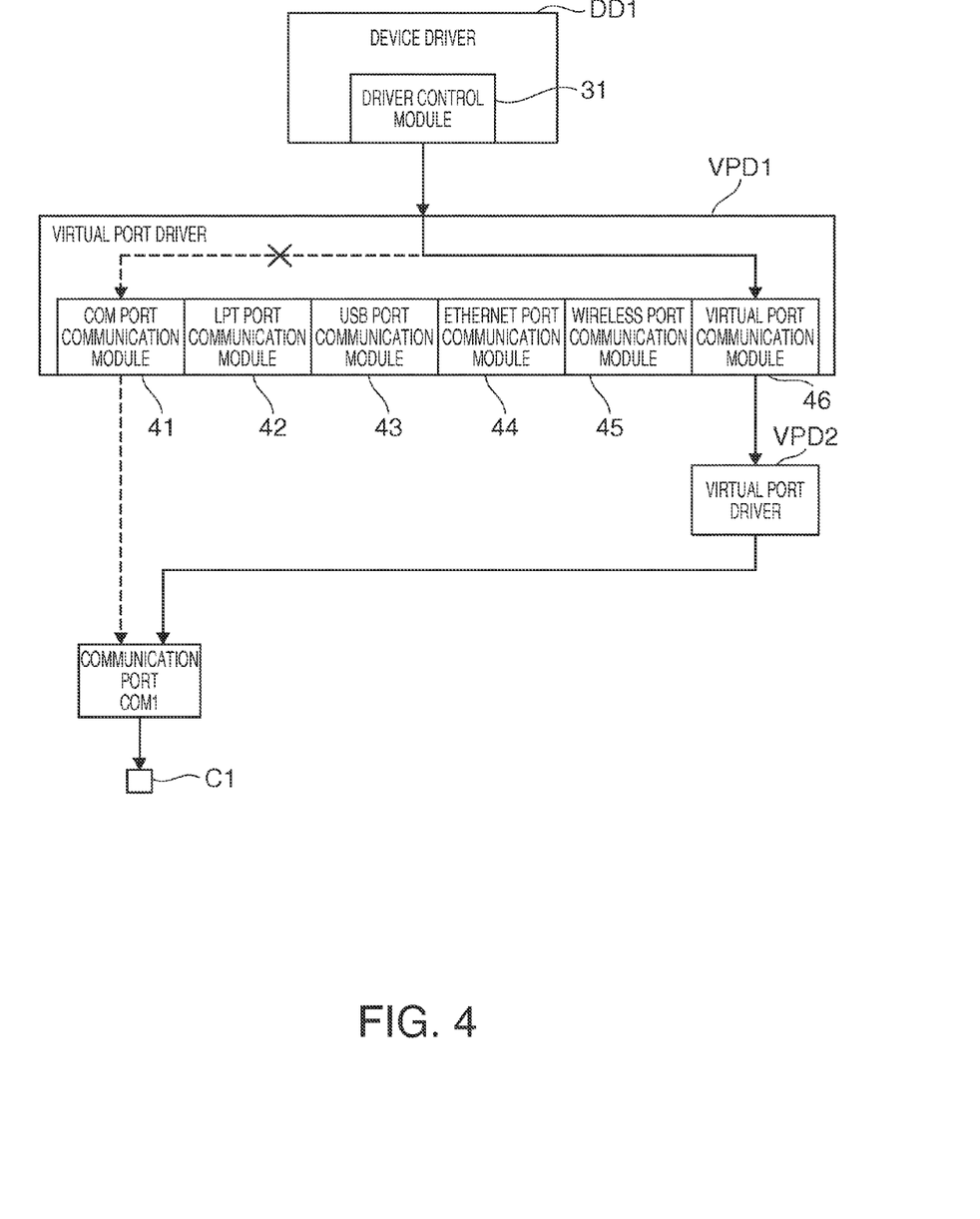
FIG. 4 illustrates the configuration of the device driver DD1 and virtual port driver VPD1 in detail, according to embodiments of the invention.

FIG. 4 describes the configuration of the device driver DD1 and the virtual port driver VPD1.

The virtual port driver VPD1 has the following modules as shown in FIG. 4.
1. COM port communication module 41 that can communicate with serial communication ports (COM1, COM2, and so forth).
2. LPT port communication module 42 that can communicate with parallel communication ports LPT (LPT1, LPT2, and so forth).
3. USB port communication module 43 that can communicate with Universal Serial Bus (USB) communication ports USB (USB1, USB2, and so forth).
4. Ethernet® port communication module 44 that can communicate with an Ethernet® port conforming to a wired LAN communication standard.
5. Wireless port communication module 45 that can communicate with a wireless communication port conforming to a wireless LAN communication standard.

6. Virtual port communication module 46 that emulates the device driver DD2 used by the virtual port driver VPD2 for the virtual port driver VPD2.

Note that because the virtual port driver VPD1 is configured to communicate through communication port COM1 with the driver control module of the device driver DD1, the virtual port driver VPD1 should communicate through the COM port communication module 41 as indicated by the dotted line arrow in FIG. 4.

However, because communication port COM1 is occupied by the virtual port driver VPD2 as described above, the virtual port driver VPD1 asserts a communicate request through the virtual port communication module 46 to the virtual port driver VPD2 as indicated by the solid line arrow in FIG. 4 to emulate a driver control module (not shown) of the device driver DD2.

Figure 5:
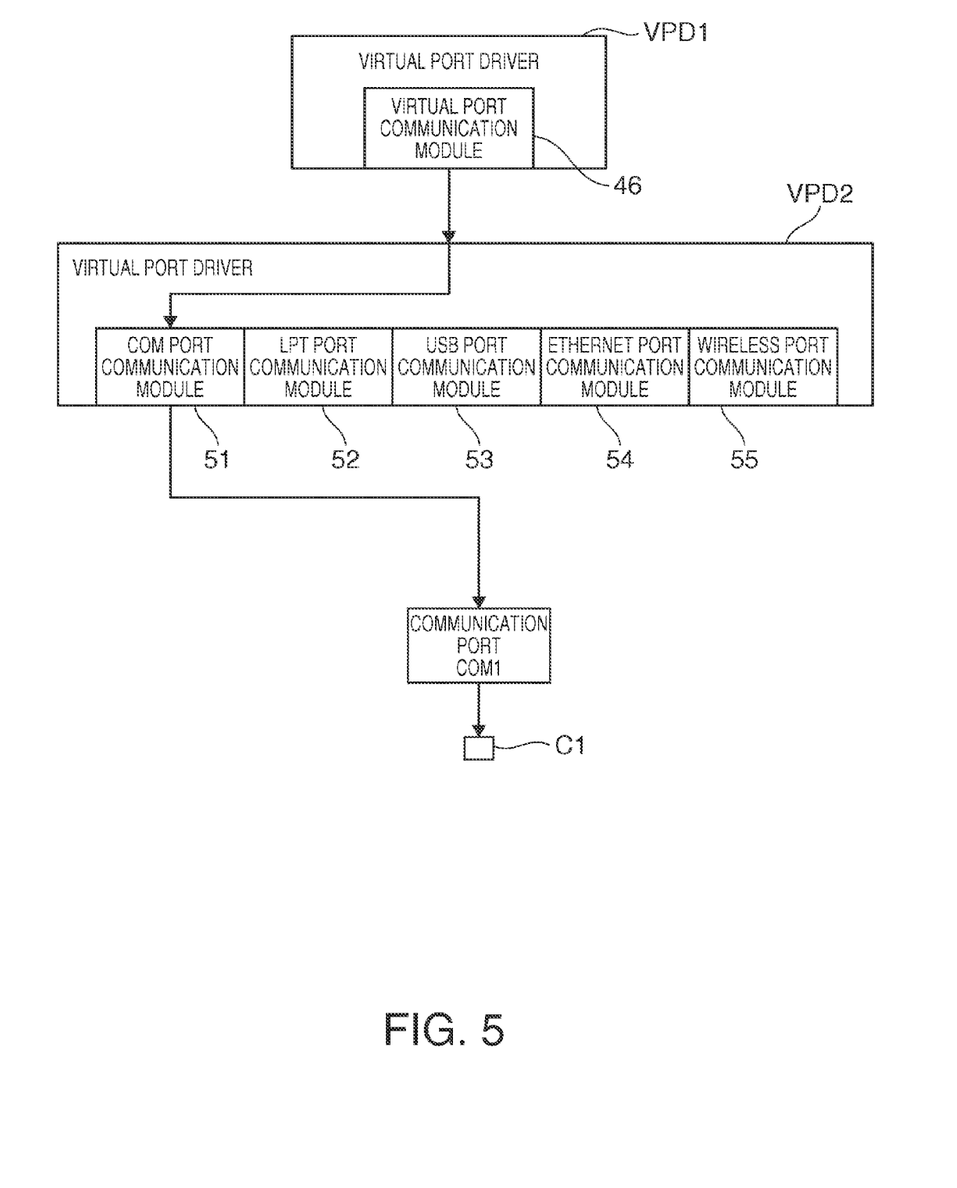
FIG. 5 illustrates the configuration of a virtual port driver VPD2 in accordance with embodiments of the invention.

FIG. 5 shows the configuration of the virtual port driver VPD2 in detail.

As shown in FIG. 5 the virtual port driver VPD2 has the following modules.

1. COM port communication module 51 that can communicate with serial communication ports (COM1, COM2, and so forth).
2. LPT port communication module 52 that can communicate with parallel communication ports LPT (LPT1, LPT2, and so forth).
3. USB port communication module 53 that can communicate with Universal Serial Bus (USB) communication ports USB (USB1, USB2, and so forth).
4. Ethernet® port communication module 54 that can communicate with an Ethernet® port conforming to a wired LAN communication standard.
5. Wireless port communication module 55 that can communicate with a wireless communication port conforming to a wireless LAN communication standard.

Because the virtual port driver VPD2 is configured to communicate through the communication port COM1 with the driver control module (not shown) of the device driver DD2, the virtual port driver VPD2 communicates through the COM port communication module 51 and communication port COM1 as shown by the solid line arrow in FIG. 5 so that the device driver DD1 can communicate with the printer 11.

A specific communication control process is described next using by way of example printing by means of a printer connected to a COM port.

Figure 6:
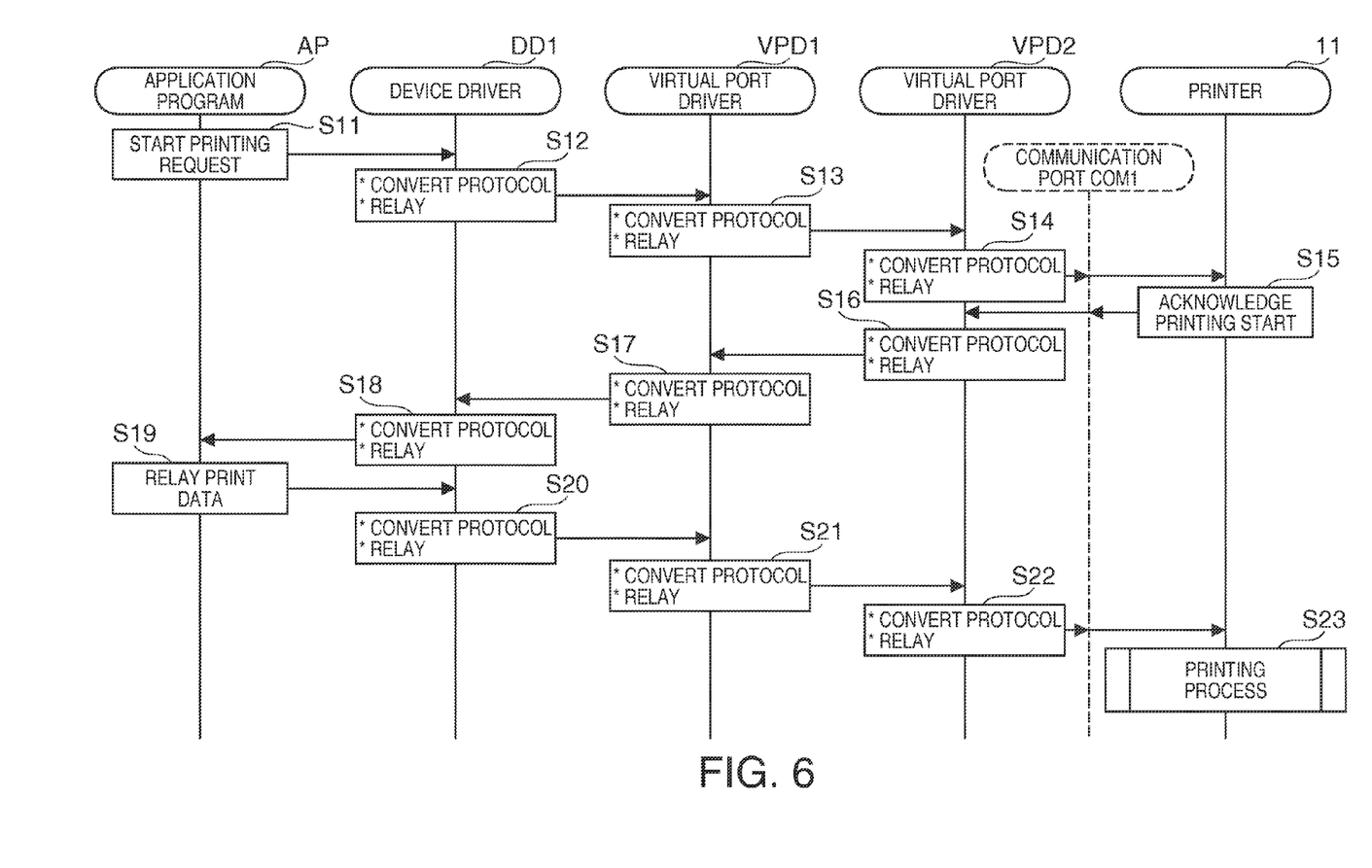
FIG. 6 is a sequence flow chart of the printing process, according to a preferred embodiment of the invention.

FIG. 6 is a flow chart of the communication sequence in this embodiment of the invention when printing.

The device driver DD1 of an application program AP that runs on the POS terminal 12 first converts the start printing request of the application program AP (step S11) to the protocol of the communication port addressed by the application program (such as the LPT port in this example), and relays the start printing request to the virtual port driver VPD1 (step S12).

The virtual port driver VPD1 to which the start printing request was relayed functions identically to the actual device driver DD2 that corresponds to the virtual port driver VPD2. That is, the virtual port driver VPD1 converts the relayed start printing request to the protocol of the communication port used by the device driver DD2 (the USB port in this example), and relays the request through the virtual port communication module 46 to the virtual port driver VPD2 (step S13). Therefore, the virtual port driver VPD1 emulates the communication port addressed by the device driver DD1 for the device driver DD1, and emulates the device driver DD2 for the virtual port driver VPD2.

The virtual port driver VPD2 then converts the relayed start printing request to the communication protocol for communicating through the COM port communication module with the communication port COM1, and outputs the result to the communication port COM1. As a result, the start printing request is applied to the printer 11 through the communication port COM1, connector Cl, communication cable, and connector C2 (step S14). That is, the virtual port driver VPD2 emulates communication port COM1 for virtual port driver VPD1, and emulates device driver DD2 for communication port COM1.

If the printer 11 that received the start printing request can receive print data, it sends a print start acknowledgement to the communication port COM1 of the POS terminal 12 through connector C2, the communication cable, and connector C1 (step S15).

The virtual port driver VPD2 receives the print start acknowledgement through the communication port COM1, converts the communication protocol of the communication port COM1 to the communication protocol of the virtual port driver VPD1, and relays the acknowledgement to the virtual port driver VPD1 (step S16). More specifically, the virtual port driver VPD2 emulates the device driver DD2 for the communication port COM1, and emulates the communication port COM1 for the device driver DD1.

As a result, the virtual port driver VPD1 that received the print start acknowledgement from the communication port COM1 by means of emulation converts the communication protocol to the communication protocol of the device driver DD1 and relays the acknowledgement to the device driver DD1 (step S17). In other words, the virtual port driver VPD1 emulates the device driver DD2 for the virtual port driver VPD2, and emulates the communication port used by the device driver DD1 for the device driver DD1.

The device driver DD1 then converts the received print start acknowledgement to the data format used by the application program AP and relays the acknowledgement to the application program (step S18).

The application program AP that received the print start acknowledgement from the device driver DD1 then sends the print data that is required to print, including the printing control commands and the actual print data, to the device driver DD1 (step S19).

As a result, the device driver DD1 converts the print data to the protocol of the communication port (such as the LPT port) addressed by the application program and relays the print data to the virtual port driver VPD1 (step S20).

The virtual port driver VPD1 to which the print data was relayed then converts the relayed print data to the protocol of the communication port addressed by the device driver DD2 (such as the USB port), and then relays the print data through the virtual port communication module 46 to the virtual port driver VPD2 (step S21). The virtual port driver VPD1 thus emulates the communication port used by the device driver DD1 for the device driver DD1, and emulates the device driver DD2 for the virtual port driver VPD2.

The virtual port driver VPD2 then converts the relayed print data to the communication protocol of the communication port COM1 through the COM port communication module, and outputs to the communication port COM1. As a result, the print data is relayed to the printer 11 through the communication port COM1, connector C1, communication cable, and connector C2 (step S22). The virtual port driver VPD2 thus emulates the communication port COM1 for the virtual port driver VPD1, and emulates the device driver DD2 for the communication port COM1.

As a result, the printer 11 interprets the printing control commands and print data contained in the relayed printing data, and executes the printing process (step S23).

In this embodiment of the invention as described above, when one virtual port driver tries to communicate through a communication port that is occupied by another virtual port driver in a communication environment in which a plurality of virtual port drivers use a single communication port, the one virtual port driver emulates the device driver to which the other virtual port driver corresponds when communicating with the other virtual port driver that is occupying the communication port so that communication with a controlled device connected through that communication port is possible.

If when a virtual port driver VPD1 is installed there is another virtual port driver VPD2 occupying the communication port COM1, the foregoing embodiment describes the one virtual port driver VPD1 as thereafter communicating with the communication port COM1 through the other virtual port driver VPD2.

Alternatively, however, a configuration in which the virtual port driver VPD1, which is one virtual port driver, executes a communication request process through the COM port communication module 41 to access the communication port COM1 after the virtual port driver VPD1 is installed is also conceivable. If a response to this communication request process is then not received from the communication port COM1, the invention determines that the virtual port driver VPD2, which is another virtual port driver, is occupying the communication port COM1, and goes to a communication process in which the one virtual port driver VPD1 emulates the device driver (device driver DD2 in this embodiment of the invention) to which virtual port driver VPD2 (the other virtual port driver) corresponds.

While the foregoing embodiments are described as using communication port COM1 as the communication port for communication, the invention is not so limited; rather, the invention can also be applied to other types of communication ports, including an LPT port, USB port, Ethernet® port, or wireless port, for example.

Although the present invention has been described in connection with the preferred embodiments thereof with reference to the accompanying drawings, various changes and modifications will be apparent to those skilled in the art in light of such disclosure. Any such change or modification is intended to be included within the scope of the present invention to the extent such change or modification is embraced by any of the claims of this application.

What is claimed is:

1. A control device to communicate with a peripheral device, comprising:
    a physical communication port to which the peripheral device connects;
    a first device driver that has a function for controlling a first physical port different from the communication port;
    a second device driver that has a function for controlling a second physical port different from the communication port;
    a first virtual port driver having a first port communication module and a second port communication module, wherein the first port communication module is configured to convert a protocol used by the first physical port to a protocol used by the communication port, and the second port communication module is configured to convert the protocol used by the first physical port to a protocol used by the second physical port; and
    a second virtual port driver that converts the protocol used by the second physical port to the protocol used by the communication port; wherein
    when the second virtual driver occupies the communication port by converting the protocol used by the second physical port to the protocol used by the communication port, the first virtual port driver uses the second port communication module to convert the protocol used by the first physical port to the protocol of the second physical port, and the first virtual port driver operates by communicating with the communication port through the second virtual port driver, and
    when the second virtual driver does not occupy the communication port, the first virtual port driver uses the first port communication module to convert the protocol used by the first physical port to the protocol used by the communication port and the first virtual port driver operates by communicating with the communication port.

2. The control device described in claim 1, wherein:
    the second device driver includes a drive control module;
    the first virtual port driver includes an emulation communication module that emulates the second device driver;
    the first virtual port driver asserts a communication request through the emulation communication module to the second virtual port driver when the communication port is occupied by the second virtual port driver.

3. The control device described in claim 1, wherein:
    when the second virtual driver does not occupy the communication port, the first virtual port driver operates by communicating directly with the communication port.

4. A control device for communicating with a peripheral device, said control device comprising:
    a first device driver having a first communication protocol compatible with a first communication port;
    a second device driver having a second communication protocol compatible with a second communication port different from said first communication port;
    a physical communication port that connects to the peripheral device, said physical communication port having a third communication protocol different from said first communication protocol and said second communication protocol;
    a first virtual driver configured to selectively relay communications between said first device driver and said physical communication port, said first virtual driver having a first function of converting between said first communication protocol and said third communication protocol, and having a second function of converting between said first communication protocol and said second communication protocol;
    a second virtual driver configured to relay communications between said second device driver and said physical communication port, said second virtual driver having a third function of converting between said second communication protocol and said third communication protocol;
    wherein:
    IF said second virtual driver does not occupy said physical communication port,
    THEN said first virtual driver relays communications between said first device driver and said physical communication port directly by establishing a communication link with said physical communication port and using said first function of converting between said first communication protocol and said third communication protocol, ELSE said first virtual driver relays communications between said first device driver and said physical communication port indirectly by establishing a communication link with said second virtual driver and using said second function of converting between said first communication protocol and said second communication protocol and having said second virtual driver relay communications between said first virtual driver and said physical communication port by using its third function of converting between said second communication protocol and said third communication protocol.

5. The control device for communicating with a peripheral device, of claim 4, wherein said peripheral device is a printer and said physical communication port is a serial port.

6. The control device for communicating with a peripheral device, of claim 5, wherein said control device is a point-of-sale, POS, device.

7. The Control device for communicating with a peripheral device, of claim 4, wherein:
said first function of said first virtual driver emulates said first communication port when communicating with said first device driver, and emulates a device driver compatible with said physical communication port when communicating with said physical communication port; and
said second function of said first virtual driver emulates said first communication port when communicating with said first device driver, and emulates said second device driver when communicating with said physical communication port.

8. The control device for communicating with a peripheral device, of claim 4, wherein;
said physical communication port can be occupied by only one device driver at a time;
upon being activated, said second device driver continuously occupies, and does not relinquish it occupation of, said physical communication port; and
said first virtual driver implements its second function in response to not being able to directly occupy said physical communication port.

9. The control device for communicating with a peripheral device, of claim 4, wherein:
said control device is a single computer terminal; and
the communications relayed from the first device driver and the second device driver are generated within the computer terminal.

10. The control device of claim 9, wherein:
the peripheral device is local to the computer terminal; and
the physical communication port is a serial port that establishes a local, physical connection with the peripheral device.

11. The Point-of-Sales device to communicate with a printer, of claim 9, wherein:
when the second virtual driver does not occupy the communication port, the first virtual port driver converts the protocol used by the first physical port to the protocol used by the communication port using the first port communication module and the first virtual port driver operates by communicating with the communication port.

12. A Point-of-Sales device to communicate with a printer, comprising:
a communication port to which the printer connects;
a first device driver that has a function for controlling a first physical port different from the communication port;
a first virtual port driver including a first port communication module configured to convert a protocol used by the first physical port to a protocol used by the communication port and a second port communication module configured to convert the protocol used by the first physical port to a protocol used by a second physical port different from the communication port;
a second device driver that has a function for controlling the second physical port; and
a second virtual port driver that converts the protocol used by the second physical port to the protocol used by the communication port; wherein
when the second virtual driver occupies the communication port, the first virtual port driver converts the protocol used by the first physical port to the protocol of the second physical port using the second port communication module, and the second virtual port driver converts the protocol used by the second physical port to the protocol used by the communication port, and the first virtual port driver operates by communicating with the communication port through the second virtual port driver.

* * * * *